US012649303B2

(12) United States Patent
Satake

(10) Patent No.: US 12,649,303 B2
(45) Date of Patent: Jun. 9, 2026

(54) GAS BARRIER FILM AND BARRIER LAMINATE

(71) Applicant: TOPPAN HOLDINGS INC., Tokyo (JP)

(72) Inventor: Tetsuo Satake, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 19/011,983

(22) Filed: Jan. 7, 2025

(65) Prior Publication Data

US 2025/0144922 A1      May 8, 2025

Related U.S. Application Data

(63) Continuation of application No. PCT/JP2023/025559, filed on Jul. 11, 2023.

(30) Foreign Application Priority Data

Jul. 12, 2022   (JP) ................................. 2022-111829
Jul. 12, 2022   (JP) ................................. 2022-111830

(51) Int. Cl.
   *B32B 27/08*      (2006.01)
   *B32B 27/16*      (2006.01)
   *B32B 27/30*      (2006.01)
   *B32B 27/32*      (2006.01)
(52) U.S. Cl.
   CPC .............. *B32B 27/08* (2013.01); *B32B 27/16* (2013.01); *B32B 27/306* (2013.01); *B32B 27/32* (2013.01);
   (Continued)

(58) Field of Classification Search
   CPC ....... B32B 27/08; B32B 27/16; B32B 27/306; B32B 27/32; B32B 2250/246;
   (Continued)

(56) References Cited

U.S. PATENT DOCUMENTS

2008/0053512 A1*   3/2008   Kawashima ............ H10F 19/85
                                                        136/244
2009/0022981 A1*   1/2009   Yoshida ................... C08J 7/043
                                                        428/336
(Continued)

FOREIGN PATENT DOCUMENTS

EP          4 008 552 A1      6/2022
JP        2021-194822 A      12/2021
                 (Continued)

OTHER PUBLICATIONS

International Searching Authority, "International Search Report," issued in connection with International Patent Application No. PCT/JP2023/025559, dated Oct. 17, 2023.
(Continued)

*Primary Examiner* — Betelhem Shewareged
(74) *Attorney, Agent, or Firm* — Foley & Lardner LLP

(57)            ABSTRACT

A gas barrier film includes: a substrate layer containing polypropylene or polyethylene as a main component; a gas barrier layer formed on a side of a first surface of the substrate layer; and a heat seal layer that is formed on a second surface opposite to the first surface and contains polypropylene or polyethylene as a main component. A peel strength between the substrate layer and the heat seal layer is 1.0 N/15 mm or more and 7.0 N/15 mm or less in a 180° peel test in accordance with JIS K 6854-2, and 1.0 N/15 mm or more and 4.0 N/15 mm or less in a T-peel test in accordance with JIS K 6854-3.

20 Claims, 2 Drawing Sheets

(52) U.S. Cl.
CPC ..... *B32B 2250/246* (2013.01); *B32B 2255/10* (2013.01); *B32B 2255/20* (2013.01); *B32B 2255/28* (2013.01); *B32B 2307/31* (2013.01); *B32B 2307/7244* (2013.01); *B32B 2307/7246* (2013.01); *B32B 2307/748* (2013.01)

(58) Field of Classification Search
CPC ............ B32B 2255/10; B32B 2255/20; B32B 2255/28; B32B 2307/31; B32B 2307/7244; B32B 2307/7246; B32B 2307/748
USPC ........................................................ 428/200
See application file for complete search history.

(56) References Cited

U.S. PATENT DOCUMENTS

2009/0181244 A1 * 7/2009 Fukugami ............... B32B 27/34
428/476.3

2022/0153000 A1 5/2022 Osawa
2022/0288902 A1 9/2022 Hayashi et al.
2024/0391224 A1 11/2024 Osawa
2025/0144922 A1 * 5/2025 Satake ................... B32B 27/32

FOREIGN PATENT DOCUMENTS

WO WO-2019/087960 A1 5/2019
WO WO-2021/112243 A1 6/2021
WO WO-2022/168976 A1 8/2022

OTHER PUBLICATIONS

International Searching Authority, "Written Opinion," issued in connection with International Patent Application No. PCT/JP2023/025559, dated Oct. 17, 2023.
European Extended Search Report dated Sep. 22, 2025, issued in corresponding European Patent Application No. 23839623.8.

* cited by examiner

1

GAS BARRIER FILM AND BARRIER LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2023/025559, filed on Jul. 11, 2023, which is based upon and claims the benefit to Japanese Patent Application No. 2022-111829, filed on Jul. 12, 2022 and to Japanese Patent Application No. 2022-111830, filed Jul. 12, 2022; the disclosures of all which are incorporated herein by reference in their entirety.

TECHNICAL FIELD

The present invention relates to gas barrier films using a resin substrate. A barrier laminate using this gas barrier film will also be mentioned.

BACKGROUND

A gas barrier film is a film that has properties that do not allow oxygen, water vapor, and the like to pass through it (gas barrier properties). To prevent deterioration of the contents and maintain their functions and properties, they are widely used in a variety of fields that require the blocking of various gases, such as the packaging of precision electronic parts, electronic components, food, and pharmaceuticals.

In recent years, due to the growth in environmental awareness triggered by issues of marine plastic waste and the like, it is required to increase the efficiency in sorting, collecting, and recycling plastic materials. Gas barrier films, which have been developed by combining various different materials to improve performance, are also required to be mono-materials.

To achieve mono-material gas barrier films, it is necessary to increase the proportion of resin, which is the primary component used in gas barrier films. As an example of such a configuration, PTL 1 discloses a barrier film that includes a polyethylene substrate and is formed with an aluminum oxide vapor-deposition film.

[Citation List] [Patent Literature] [PTL 1] WO 2019/ 087960 A

SUMMARY OF THE INVENTION

Problem to be Solved by the Invention

When a gas barrier film is used as an intermediate layer of a multilayer laminate film, the surface of the multilayer laminate film on which the gas barrier layer is not formed is required to have good adhesion to an adhesive or ink layer. Although PTL 1 focuses on the adhesion between the substrate and the aluminum oxide vapor-deposition film, no attention is paid to the surface on which the vapor-deposition film is not formed.

Peel tests conforming to JIS K 6854-2 and JIS K 6854-3 are widely used to evaluate the adhesion of multilayer laminate films. In this peel test, a phenomenon called "zipping" may occur in which the peeling does not proceed smoothly but progresses and stops alternately. If zipping occurs in a peel test, the adhesion of a multilayer laminate film may not be evaluated correctly. This makes it difficult to determine whether the produced film satisfies the required characteristics.

In view of the above circumstances, the present invention aims to provide a gas barrier film and a barrier laminate in which a surface that is not formed with a gas barrier layer has good adhesion, and that can be easily realized as mono-materials.

Solution to Problem

The present invention has the following modes.

[1] A gas barrier film including: a substrate layer containing polypropylene or polyethylene as a main component; a gas barrier layer formed on a side of a first surface of the substrate layer; and a heat seal layer that is formed on a second surface opposite to the first surface and contains polypropylene or polyethylene as a main component, in which a peel strength between the substrate layer and the heat seal layer is 1.0 N/15 mm or more and 7.0 N/15 mm or less in a 180° peel test in accordance with JIS K 6854-2, and 1.0 N/15 mm or more and 4.0 N/15 mm or less in a T-peel test in accordance with JIS K 6854-3.

[2] The gas barrier film according to [1], in which a polar component value of a surface free energy of the second surface opposite to the first surface is 0.1 mJ/m$^2$ or more.

[3] The gas barrier film according to [1], in which the second surface opposite to the first surface is made of a copolymer, and a polar component value of a surface free energy of the second surface is 0.1 mJ/m$^2$ or more.

[4] The gas barrier film according to any one of [1] to [3], in which a polar component value of a surface free energy of the second surface is less than 1.3 mJ/m$^2$.

[5] The gas barrier film according to any one of [1] to [4], in which the gas barrier layer contains at least one of silicon oxide, silicon oxide containing carbon, silicon nitride, metallic aluminum, and aluminum oxide.

[6] The gas barrier film according to any one of [1] to [5], in which the first surface is made of any one of polypropylene; polyethylene; a composite of polypropylene and polyethylene; a composite of polypropylene, polyethylene, and an α-olefin; polyvinyl alcohol; and an ethylene-vinyl alcohol copolymer.

[7] The gas barrier film according to any one of [1] to [6], further including a coating layer formed on the gas barrier layer, in which the coating layer contains any one of a metal alkoxide, a hydrolysate of a metal alkoxide, a water-soluble macromolecule, a polycarboxylic acid polymer, a polyvalent metal compound, and a polyvalent metal salt of a carboxylic acid that is a reaction product of a polycarboxylic acid polymer and a polyvalent metal compound.

[8] The gas barrier film according to any one of [1] to [7], further including an undercoat layer provided between the first surface and the gas barrier layer, in which the undercoat layer contains at least one of thermosetting resin, thermoplastic resin, ultraviolet-curable resin, or electron beam-curable resin.

[9] The gas barrier film according to [1] or [2], in which the peel strength between the substrate layer and the heat seal layer is 2.0 N/15 mm or more and 7.0 N/15 mm or less in the 180° peel test in accordance with JIS K 6854-2.

[10] The gas barrier film according to [3], in which a difference between maximum and minimum values of the peel strength in the 180° peel test is less than 0.3 N/15 mm.

[11] A barrier laminate including: the gas barrier film according to any one of [1] to [10]; and the heat seal layer that contains a main component that is the same as that of the substrate layer and is bonded to the gas barrier film.

[12] The barrier laminate according to [11], further including a surface layer that contains a main component that is the same as that of the substrate layer and is bonded to the gas barrier film.

[13] The barrier laminate according to [12], in which at least one of the heat seal layer and the surface layer is bonded to the gas barrier film with an adhesive.

[14] The barrier laminate according to [12] or [13], in which the surface layer has a printed layer on at least one surface.

The present invention includes the following modes as one aspect.

[A1] A gas barrier film including: a substrate layer containing polypropylene or polyethylene as a main component; and a gas barrier layer formed on a side of a first surface of the substrate layer.

This gas barrier film has a polar component value of a surface free energy of the second surface opposite to the first surface is 0.1 mJ/m$^2$ or more.

[A2] The gas barrier film according to [A1], in which a polar component value of a surface free energy of the second surface is less than 1.3 mJ/m$^2$.

[A3] The gas barrier film according to [A1] or [A2], in which the gas barrier layer contains at least one of silicon oxide, silicon oxide containing carbon, silicon nitride, metallic aluminum, and aluminum oxide.

[A4] The gas barrier film according to any one of [A1] to [A3], in which the first surface is made of any one of polypropylene; polyethylene; a composite of polypropylene and polyethylene; a composite of polypropylene, polyethylene, and an α-olefin; polyvinyl alcohol; and an ethylene-vinyl alcohol copolymer.

[A5] The gas barrier film according to any one of [A1] to [A4], further including a coating layer formed on the gas barrier layer, in which the coating layer contains any one of a metal alkoxide, a hydrolysate of a metal alkoxide, a water-soluble macromolecule, a polycarboxylic acid polymer, a polyvalent metal compound, and a polyvalent metal salt of a carboxylic acid that is a reaction product of a polycarboxylic acid polymer and a polyvalent metal compound.

[A6] The gas barrier film according to any one of [A1] to [A5], further including an undercoat layer provided between the first surface and the gas barrier layer, in which the undercoat layer contains at least one of thermosetting resin, thermoplastic resin, ultraviolet-curable resin, or electron beam-curable resin.

[A7] A barrier laminate including: the gas barrier film according to any one of [A1] to [A6]; and the heat seal layer that contains a main component that is the same as that of the substrate layer and is bonded to the gas barrier film.

[A8] The barrier laminate according to [A7], further including a surface layer that contains a main component that is the same as that of the substrate layer and is bonded to the gas barrier film.

[A9] The barrier laminate according to [A8], in which at least one of the heat seal layer and the surface layer is bonded to the gas barrier film with an adhesive.

[A10] The barrier laminate according to [A8] or [A9], in which the surface layer has a printed layer on at least one surface.

The present invention includes the following modes as another aspect.

[B1] A gas barrier film including: a substrate layer containing polypropylene or polyethylene as a main component; and a gas barrier layer formed on a side of a first surface of the substrate layer.

In this gas barrier film, the second surface opposite to the first surface is made of a copolymer, and a polar component value of a surface free energy of the second surface is 0.1 mJ/m$^2$ or more.

[B2] The gas barrier film according to [B1], in which a polar component value of a surface free energy of the second surface is less than 1.3 mJ/m$^2$.

[B3] The gas barrier film according to [B1] or [B2], in which the gas barrier layer contains at least one of silicon oxide, silicon oxide containing carbon, silicon nitride, metallic aluminum, and aluminum oxide.

[B4] The gas barrier film according to any one of [B1] to [B3], in which the first surface is made of any one of polypropylene; polyethylene; a composite of polypropylene and polyethylene; a composite of polypropylene, polyethylene, and an α-olefin; polyvinyl alcohol; and an ethylene-vinyl alcohol copolymer.

[B5] The gas barrier film according to any one of [B1] to [B4], further including a coating layer formed on the gas barrier layer, in which the coating layer contains any one of a metal alkoxide, a hydrolysate of a metal alkoxide, a water-soluble macromolecule, a polycarboxylic acid polymer, a polyvalent metal compound, and a polyvalent metal salt of a carboxylic acid that is a reaction product of a polycarboxylic acid polymer and a polyvalent metal compound.

[B6] The gas barrier film according to any one of [B1] to [B5], further including an undercoat layer provided between the first surface and the gas barrier layer, in which the undercoat layer contains at least one of thermosetting resin, thermoplastic resin, ultraviolet-curable resin, or electron beam-curable resin.

[B7] A barrier laminate including: the gas barrier film according to any one of [B1] to [B6]; and the heat seal layer that contains a main component that is the same as that of the substrate layer and is bonded to the gas barrier film.

[B8] The barrier laminate according to [B7], further including a surface layer that contains a main component that is the same as that of the substrate layer and is bonded to the gas barrier film.

[B9] The barrier laminate according to [B8], in which at least one of the heat seal layer and the surface layer is bonded to the gas barrier film with an adhesive.

[B10] The barrier laminate according to [B8] or [B9], in which the surface layer has a printed layer on at least one surface.

Advantageous Effects of the Invention

According to the present invention, a gas barrier film and a barrier laminate can be provided in which a surface that is not formed with a gas barrier layer has good adhesion, and that can be easily realized as mono-materials.

DETAILED DESCRIPTION

First Embodiment

Figure 1:
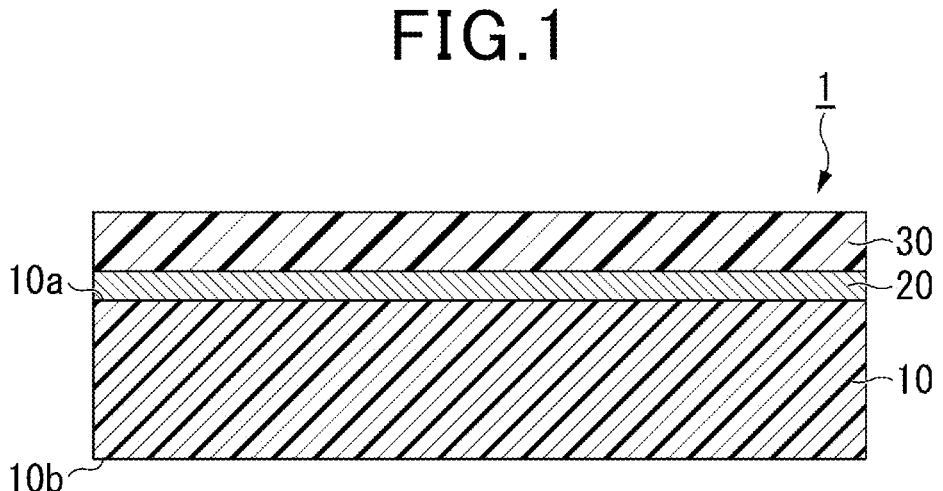
FIG. 1 is a schematic cross-sectional view of a gas barrier film according to an embodiment of the present invention.

With reference to FIG. 1, a first embodiment of the present invention will be described below.

FIG. 1 is a schematic cross-sectional view of a gas barrier film 1 according to the present embodiment. The gas barrier film 1 includes a substrate layer 10, a gas barrier layer 20 formed on a first surface 10a of the substrate layer 10, and a coating layer 30 covering the gas barrier layer 20.

The substrate layer 10 is a resin film containing polypropylene or polyethylene as a main component. The substrate layer 10 may be a non-stretched film or a stretched film. When a stretched film is used, the stretch ratio is not specifically limited. The thickness of the substrate layer 10 is also not specifically limited. According to factors such as the application of the packaging material, the substrate layer 10 may be a single layer film, or a multilayer film obtained by laminating films having different properties. Practically, in view of processability for forming the gas barrier layer 20, the coating layer 30, and the like, the thickness of the substrate layer 10 is preferably 3 to 200 μm, and more preferably 6 to 50 μm. The substrate layer 10 may be in the form of a long material or a sheet material cut to a predetermined size, but a long substrate material may be preferably used. Although the length of the long substrate layer 10 in the longitudinal direction is not particularly limited, for example, a long film of 10 m or more is preferably used. Note that since there is no upper limit to the length, and it may be, for example, about 10 km long. When this is the case, it can be transported and stored efficiently by winding it in a roll.

The "main component" of the substrate layer 10 refers to the substance that has the largest mass among the substances constituting the substrate layer 10. Note that, in this embodiment, the "main component" of a configuration refers to the substance that has the largest mass among the substances constituting the configuration.

When the main component of the substrate layer 10 is polypropylene, the main component of the substrate layer 10 is not limited to a resin obtained by polymerizing only propylene, and a resin containing substances other than propylene can be used. For example, it is also possible to use copolymers obtained by copolymerization of propylene and 0.1% to several tens of percent of polyethylene such as HDPE (high density polyethylene), MDPE (medium density polyethylene), LDPE (low density polyethylene), and LLDPE (linear low density polyethylene), and multimers obtained by copolymerization of propylene or ethylene and 0.1% to several tens of percent of α-olefin resins such as 1-butene and/or a rubber component such as elastomer. Further, instead of a copolymer layer, a layer in which a plurality of kinds of resins are mixed and dispersed may also be used.

When the main component of the substrate layer 10 is polyethylene, the polyethylene resin may be one or more selected from HDPE, LDPE, MDPE, and LLDPE. It is also possible to use copolymers or multimers obtained by copolymerization of ethylene with 0.1% to several tens of percent of α-olefin resins such as 1-butene and/or a rubber component such as elastomer.

The substrate layer 10 may be a multilayer film in which films having different properties are laminated. In this case, the surface of the substrate layer 10 that serves as the first surface 10a may be provided with a layer made of any one of polypropylene; polyethylene; a composite of polypropylene and polyethylene; a composite of polypropylene, polyethylene, and an α-olefin; polyvinyl alcohol; and an ethylene-vinyl alcohol copolymer.

When the substrate layer 10 has a multilayer structure, the substrate layer 10 may have a layer containing polypropylene or polyethylene as a main component and a layer not containing the main component. For example, if the layer forming the first surface 10a is a layer made only of PVA (polyvinyl alcohol) or EVOH (ethylene-vinyl alcohol copolymer), the barrier performance of the gas barrier film 1 can be improved.

The substrate layer 10 having a plurality of layers (also called a multilayer substrate) can be formed by laminating a plurality of films together using an adhesive, co-extrusion using a plurality of screws, or the like. When a multilayer substrate formed by co-extrusion is observed with an optical microscope, the boundaries between the layers cannot be clearly identified. However, by appropriately dyeing it and observing the cross section with a transmission electron microscope (TEM), the boundaries between the layers can be identified.

The substrate layer 10 may contain an additive that is not a resin component. The additive can be appropriately selected from various known additives. Examples of additives include antiblocking agents (AB agents), heat stabilizers, weather stabilizers, ultraviolet absorbers, lubricants, slip agents, nucleating agents, antistatic agents, antifogging agents, pigments, and dyes. The AB agents may be either organic or inorganic. These additives may be used singly or in combination of two or more. Of the above additives, a lubricant and a slip agent are preferred for better processability. The content of an additive in the substrate layer 10 can be appropriately adjusted as long as it does not impair the effect of the gas barrier film in this embodiment.

The gas barrier layer 20 is a layer of a single substance or a mixture of substances whose main component is silicon oxide, silicon oxide containing carbon, silicon nitride, metallic aluminum, or aluminum oxide. The gas barrier layer 20 exhibits barrier properties against certain gases such as oxygen and water vapor. There may be a plurality of main components with the largest mass in the gas barrier layer 20. The gas barrier layer 20 may be transparent or opaque.

The thickness of the gas barrier layer 20 varies depending on the type, composition, and film formation method of the components used, but in general can be set appropriately in a range of 3 to 300 nm. When the thickness of the gas barrier layer 20 is less than 3 nm, the film may not be uniform or may not have sufficient thickness, and may fail to sufficiently exhibit functions as a gas barrier layer. When the thickness of the gas barrier layer 20 is more than 300 nm, the gas barrier layer 20 may crack when external factors such as bending and tension are applied after the film is formed, resulting in loss of barrier properties. The thickness of the gas barrier layer 20 is more preferably 6 to 150 nm.

The film formation method of the gas barrier layer 20 is not specifically limited. For example, vapor deposition, plasma activated deposition, ion beam deposition, ion plating, sputtering, plasma vapor deposition (CVD), and the like can be used. These methods can be combined with a plasma assisted method, an ion assisted method, or the like to form a gas barrier layer 20 with high density to thereby enhance barrier properties and adhesiveness.

The coating layer 30 covers and protects the gas barrier layer 20 and also further enhances the barrier properties of the gas barrier film 1. The coating layer 30 is an optional component and can be omitted.

The coating layer 30 can be a coating layer made of thermoplastic resin, thermosetting resin, ultraviolet-curable resin, a metal alkoxide or a hydrolysate thereof, a water-soluble macromolecule, a polycarboxylic acid polymer, a polyvalent metal compound, or a polyvalent metal salt of a carboxylic acid that is a reaction product of a polycarboxylic acid polymer and a polyvalent metal compound. In particular, a coating layer containing a metal alkoxide and a water-soluble macromolecule that have good oxygen barrier properties is preferred. This coating layer is formed using a coating agent having a base agent composed of an aqueous solution or a water/alcohol mixed solution containing a water-soluble macromolecule and one or more metal alkoxides or hydrolyzates thereof. For example, the coating agent is prepared by mixing a solution in which a water-soluble polymer is dissolved in an aqueous (water or water/alcohol mixture) solvent with a metal alkoxide directly or after hydrolyzing or otherwise treating the metal alkoxide in advance. The coating agent is applied to the gas barrier layer 20, and dried to form the coating layer 30.

The details of the components contained in the coating agent for forming the coating layer 30 will be described. Examples of the water-soluble polymer used for the coating agent may include PVA, polyvinyl pyrrolidone, starch, methyl cellulose, carboxymethyl cellulose, and sodium alginate. In particular, PVA is preferable since it is suitable for obtaining excellent gas barrier properties. PVA is typically obtained by saponifying polyvinyl acetate. The PVA may be either a partially saponified PVA, in which several tens % of acetate groups remain, or a fully saponified PVA, in which only several % of acetate groups remain. A PVA intermediate between these PVAs may also be used.

The metal alkoxide used for the coating agent is a compound represented by the general formula M(OR)n (where M is a metal such as Si or Al, and R is an alkyl group such as $CH_3$ and $C_2H_5$). Specifically, tetraethoxysilane [Si$(OC_2H_5)_4$], aluminum triisopropoxide Al[OCH$(CH_3)_2$]$_3$, or the like may be used. Examples of silane coupling agents include a compound having an epoxy group such as 3-glycidoxypropyltrimethoxysilane, a compound having an amino group such as 3-aminopropyltrimethoxysilane, a compound having a mercapto group such as 3-mercapto-propyltrimethoxysilane, a compound having an isocyanate group such as 3-isocyanate propyltricthoxysilane, and tris-(3-trimethoxysilylpropyl) isocyanurate.

The polycarboxylic acid polymer refers to a polymer having two or more carboxyl groups in a molecule. Examples of the polycarboxylic acid polymer include polymers (copolymers) of ethylene-based unsaturated carboxylic acids; copolymers of ethylene-based unsaturated carboxylic acids and other ethylene-based unsaturated monomers; and acidic polysaccharides having a carboxyl group in the molecule such as alginic acid, carboxymethyl cellulose, and pectin. Examples of the ethylenically unsaturated carboxylic acid include acrylic acid, methacrylic acid, itaconic acid, maleic acid, fumaric acid, and crotonic acid. Examples of the ethylenically unsaturated monomer copolymerizable with the ethylenically unsaturated carboxylic acid include saturated carboxylic acid vinyl esters such as ethylene, propylene, and vinyl acetate, alkyl acrylates, alkyl methacrylates, alkyl itaconates, vinyl chloride, vinylidene chloride, styrene, acrylamide, and acrylonitrile. These polycarboxylic acid polymers may be used alone or as a mixture of two or more.

From the viewpoint of gas barrier properties, it is preferably a polymer containing a constituent unit derived from at least one polymerizable monomer selected from the group consisting of acrylic acid, maleic acid, methacrylic acid, itaconic acid, fumaric acid, and crotonic acid among the above components. It is particularly preferably a polymer containing a constituent unit derived from at least one polymerizable monomer selected from the group consisting of acrylic acid, maleic acid, methacrylic acid, and itaconic acid. In the polymer, the proportion of the constituent unit derived from at least one polymerizable monomer selected from the group consisting of acrylic acid, maleic acid, methacrylic acid, and itaconic acid is preferably 80 mol % or more, and more preferably 90 mol % or more (where the constituent units constituting the polymer add up to 100 mol % in total). The polymer may be a homopolymer or a copolymer. When the polymer is a copolymer containing an additional constituent unit other than the above constituent units, the additional constituent unit may be, for example, a constituent unit derived from the above-described ethylenically unsaturated monomer copolymerizable with the ethylenically unsaturated carboxylic acid.

The polycarboxylic acid polymer preferably has a number average molecular weight in the range of 2,000 to 10,000,000, and more preferably in the range of 5,000 to 1,000,000. If the polycarboxylic acid polymer has a number average molecular weight of less than 2,000, the gas barrier film may not have sufficient water resistance depending on its purpose, and moisture may cause deterioration of gas barrier properties and transparency or may cause occurrence of blushing. On the other hand, if it has a number average molecular weight of more than 10,000,000, the high viscosity of the coating agent may cause deterioration of coatability. In this embodiment, the number average molecular weight is obtained by gel permeation chromatography (GPC) in terms of polystyrene.

Various additives can be added to the coating agent containing a polycarboxylic acid polymer as a main component. For example, a crosslinking agent, curing agent, leveling agent, antifoaming agent, antiblocking agent, antistatic agent, dispersant, surfactant, softener, stabilizer, film-forming agent, or thickener may be added as long as it does not impair the barrier performance.

The solvent used for the coating agent containing a polycarboxylic acid polymer as a main component is preferably an aqueous medium. The aqueous medium may be water, an aqueous or hydrophilic solvent, or a mixture thereof. The aqueous medium is generally water or an aqueous solvent that contains water as a main component. The water content in the aqueous medium is preferably 70% by mass or more, and more preferably 80% by mass or more. Examples of the aqueous or hydrophilic solvent include alcohols such as methanol, ethanol, and isopropanol; ketones such as acetone and methyl ethyl ketone; ethers such as tetrahydrofuran; cellosolves; carbitols; and nitriles such as acetonitrile.

The polyvalent metal compound is not particularly limited as long as it is a compound that reacts with a carboxyl group of a polycarboxylic acid polymer to form a polyvalent metal salt of polycarboxylic acid. Examples of the polyvalent metal compound include zinc oxide particles, magnesium oxide particles, magnesium methoxide, copper oxide, and calcium carbonate. These may be used singly or as a mixture of two or more. Zinc oxide particles are preferred among the above example for oxygen barrier performance of the oxygen barrier film. Zinc oxide is an inorganic material that absorbs ultraviolet light. The average particle size of such zinc oxide particles is not particularly limited. From the viewpoint of gas barrier properties, transparency, and coating suitability, the average particle size is preferably 5 μm or less, more preferably 1 μm or less, and particularly preferably 0.1 μm or less.

When a coating agent containing a polyvalent metal compound as a main component is applied and dried to form a film, various additives may be added to the coating agent in addition to the zinc oxide particles, as necessary, as long as they do not impair the effects of this embodiment. Examples of the additives include a resin that is soluble or dispersible in a solvent used for the coating agent, and a dispersant, a surfactant, a softener, a stabilizer, a film forming agent, and a thickener that are soluble or dispersible in the solvent. Of these additives, the coating agent preferably contains a resin that is soluble or dispersible in the solvent used for it. This improves coatability and film formability of the coating agent. Examples of such a resin include an alkyd resin, a melamine resin, an acrylic resin, a urethane resin, a polyester resin, a phenol resin, an amino resin, a fluororesin, an epoxy resin, and an isocyanate resin. Furthermore, the coating agent preferably contains a dispersant that is soluble or dispersible in the solvent used for it. Thus, dispersibility of the polyvalent metal compound is improved. The dispersant may be an anionic surfactant or a nonionic surfactant. Examples of the surfactant include various surfactants such as (poly) carboxylic acid salts, alkyl sulfate ester salts, alkylbenzene sulfonic acid salts, alkylnaphthalene sulfonic acid salts, alkylsulfosuccinic acid salts, alkyl diphenyl ether disulfonic acid salts, alkyl phosphate salts, aromatic phosphate esters, polyoxyethylene alkyl ethers, polyoxyethylene alkyl phenol ethers, polyoxyethylene alkyl esters, alkylaryl sulfate ester salts, polyoxyethylene alkyl phosphate esters, sorbitan alkyl esters, glycerol fatty acid esters, sorbitan fatty acid esters, sucrose fatty acid esters, polyethylene glycol fatty acid esters, polyoxyethylene sorbitan alkyl esters, polyoxyethylene alkylaryl ethers, polyoxyethylene derivatives, polyoxyethylene sorbitol fatty acid esters, polyoxy fatty acid esters, and polyoxyethylene alkylamines. These surfactants may be used alone or as a mixture of two or more. When the coating agent containing a polyvalent metal compound as a main component contains an additive, the mass ratio of the polyvalent metal compound to the additive (polyvalent metal compound:additive) is preferably in the range of 30:70 to 99:1, and preferably in the range of 50:50 to 98:2.

Examples of the solvent used for the coating agent containing a polyvalent metal compound as a main component include water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate, and butyl acetate. These solvents may be used alone or as a mixture of two or more. Of these solvents, from the viewpoint of coatability, the solvent is preferably methyl alcohol, ethyl alcohol, isopropyl alcohol, toluene, ethyl acetate, methyl ethyl ketone, or water. From the viewpoint of manufacturability, the solvent is preferably methyl alcohol, ethyl alcohol, isopropyl alcohol, or water.

In the case where a polyvalent metal compound film is formed after applying and drying a coating agent containing a polycarboxylic acid polymer as a main component to form a film, some of the carboxyl groups of the polycarboxylic acid polymer may be neutralized in advance with a basic compound. By neutralizing part of the carboxyl groups of the polycarboxylic acid polymer in advance, the film of polycarboxylic acid polymer can have even better water resistance and heat resistance. Preferably, the basic compound is at least one selected from a group consisting of the above-mentioned polyvalent metal compounds, monovalent metal compounds, and ammonia. Examples of monovalent metal compounds include sodium hydroxide and potassium hydroxide.

When a coating agent obtained by mixing a polycarboxylic acid polymer and a polyvalent metal compound is applied and dried to form a film, the coating agent is prepared by mixing the polycarboxylic acid polymer, the polyvalent metal compound, water or an alcohol as a solvent, a resin or dispersant that is soluble or dispersible in the solvent, and additives as necessary. The coating layer 30 can also be formed by applying and drying such a coating agent using a known coating method.

The coating layer 30 can be applied by using a common coating method. For example, a well-known method such as dipping, roll coating, gravure coating, reverse coating, air knife coating, comma coating, die coating, screen printing, spray coating, gravure offset printing, organic vapor deposition, or the like can be used. The drying method may be one or a combination of two or more of heat application methods such as hot air drying, hot roll drying, high frequency irradiation, infrared irradiation, UV irradiation, and electron beam irradiation. Alternatively, a film that has been coated in advance on another resin substrate by the above formation method may be transferred onto the gas barrier layer 20 using a transfer method such as adhesive transfer, thermal transfer, or UV transfer.

The thickness of the coating layer 30 varies depending on the composition, coating conditions, and the like of the coating agent used, and is not specifically limited. However, when the dry thickness of the coating layer 30 is less than 0.01 μm, the film may not be uniform, resulting in a failure in obtaining sufficient gas barrier properties. When the dry thickness is more than 50 μm, cracking may easily occur in the coating layer 30. This means that a suitable thickness of the coating layer 30 is, for example, in the range of 0.01 to 50 μm, and an optimal thickness of the coating layer 30 is, for example, in the range of 0.1 to 10 μm.

The gas barrier film 1 having the above configuration can be widely used in applications in which it forms a part of various kinds of laminates having barrier properties (hereinafter may also be collectively referred to as "barrier laminates"). In this case, various layers are provided on a second surface 10b of the substrate layer 10 and on the gas barrier layer 20 or the coating layer 30 on the opposite side.

Therefore, to improve the quality of the barrier laminate produced using the gas barrier film 1, good adhesion to the layer provided on the second surface 10b is required.

The inventors conducted various studies to improve the adhesion to the layer provided on the second surface 10b. As a result, it was found that by controlling the polar component value of the surface free energy of the second surface to 0.1 mJ/m² or more, good adhesion with a layer formed thereon can be achieved.

Surface free energy is energy that originates from the intermolecular forces on the surface. While surface tension is viewed as the tension acting per unit length, surface free energy is viewed as the energy (work) acting per unit area and is used to elucidate phenomena in which the wetting relationship cannot be expressed solely by the magnitude of surface tension. Surface free energy can be calculated based on the contact angle with the target surface measured using a plurality of (for example, two or three) types of liquids whose value for each of the components (polar component, dispersive component) making up the surface free energy is known.

In the case where the gas barrier film 1 is wound into a roll or stored in a large number of stacked sheets, a phenomenon called blocking may occur in which adjacent gas barrier films adhere to each other in the thickness direction and become difficult to peel apart. When blocking occurs, the manufacturing efficiency of barrier laminates using the gas barrier film 1 decrease for reasons such as the operation of unwinding the gas barrier film 1 from the roll becoming complicated.

The inventors found that the occurrence of blocking can be reduced by controlling the polar component value of the surface free energy of the second surface to less than 1.3 $mJ/m^2$.

The polar component value of the surface free energy of the second surface 10b can be adjusted by subjecting the second surface 10b to corona treatment, plasma treatment, ozone treatment, flame treatment, or the like, or by forming a coating layer containing a thermoplastic resin, thermosetting resin, ultraviolet-curable resin, or the like on the second surface 10b.

Plasma treatment is particularly preferred among these methods because of the ease of adjusting the polar component value of the surface free energy. Argon or oxygen may be used for the plasma treatment.

In the gas barrier film 1 according to this embodiment, it is sufficient if the polar component value of the surface free energy of the second surface 10b satisfies a predetermined condition, and the material of the second surface is not particularly limited. Therefore, if the main component of the substrate layer 10 is polyethylene or polypropylene, the second surface 10b may be made of a layer that contains neither polyethylene nor polypropylene.

The gas barrier film 1 of the present embodiment having the above configuration exhibits high gas barrier performance. In addition, since the substrate layer 10 contains polyethylene or polypropylene as a main component, it is easy to make the proportion of polyethylene or polypropylene in the gas barrier film 1 be 90% by mass or more. That is, the gas barrier film 1 can be easily realized as a mono-material with high recyclability, which facilitates it to be eco-friendly.

A configuration example of a barrier laminate using this gas barrier film 1 will now be described.

Figure 2:
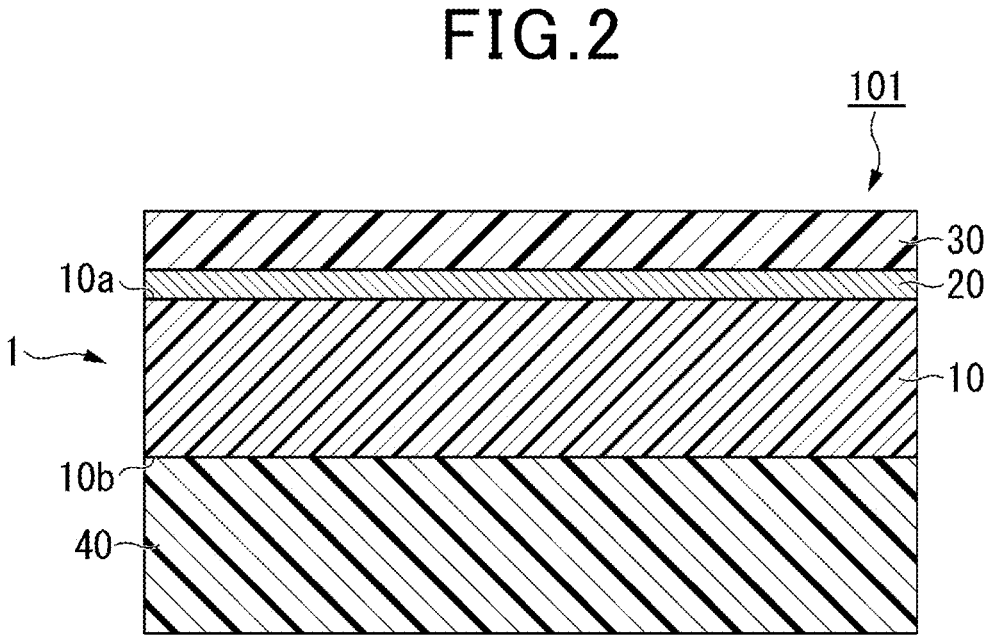
FIG. 2 is a schematic cross-sectional view showing an example of a barrier laminate using the gas barrier film.

A barrier laminate 101 shown in FIG. 2 has a configuration in which a heat seal layer 40 that can be thermally fused onto the second surface 10b of the gas barrier film 1.

By thermally fusing the peripheries of two sheets or a folded sheet of the barrier laminate 101 with the heat seal layers 40 facing each other, a packaging material such as a pouch made of the barrier laminate 101 can be formed, which can be used as a packaging body in which the contents is sealed.

The heat seal layer 40 may be made of a material such as polypropylene or polyethylene and may have a single layer or multilayer structure. By making the main component of the heat seal layer 40 the same as that of the substrate layer 10, the barrier laminate 101 can be realized as a mono-material. In this case, the same film as the substrate layer 10 can also be used as the heat seal layer 40.

Polyolefin resin components such as polypropylene and polyethylene have very low polarity (degree of +-polarization within the molecule). For this reason, a heat seal layer containing polypropylene or polyethylene as a main component is difficult to bond to the substrate layer 10 by either extrusion lamination or dry lamination.

However, in the gas barrier film 1, since the polar component of the surface free energy of the second surface 10b is 0.1 $mJ/m^2$ or more, the bondability with the heat seal layer is significantly improved. In particular, when dry lamination is used, since the polar component of the surface free energy of the second surface 10b is 0.1 $mJ/m^2$ or more, the adhesive uniformly spreads and wets it, and the molecules forming the second surface 10b interact with the molecules of the adhesive. This allows the resin film that becomes the heat seal layer to be bonded with a high adhesion strength of 1 N/15 mm or more, as measured in accordance with JIS K 6854-2 (180° peel) or JIS K 6854-3 (T-peel).

The inventors also found that in a gas barrier film 1 having the heat seal layer 40 according to this embodiment, when the peel strength between the substrate layer 10 and the heat seal layer 40 is 2.0 N/15 mm or more in a 180° peel test in accordance with JIS K 6854-2, it is possible to achieve good adhesion to the second surface 10b of the substrate layer 10, and reduce the occurrence of zipping in a peel test.

The thickness of the heat seal layer 40 can be determined depending on the purpose, and it can be around 15 to 200 μm, for example. The heat seal layer 40 may be bonded to the gas barrier film 1 by dry lamination using an adhesive, or the heat seal layer 40 may be provided by extrusion lamination using a fluid resin for forming the heat seal layer.

Figures 3, 4:
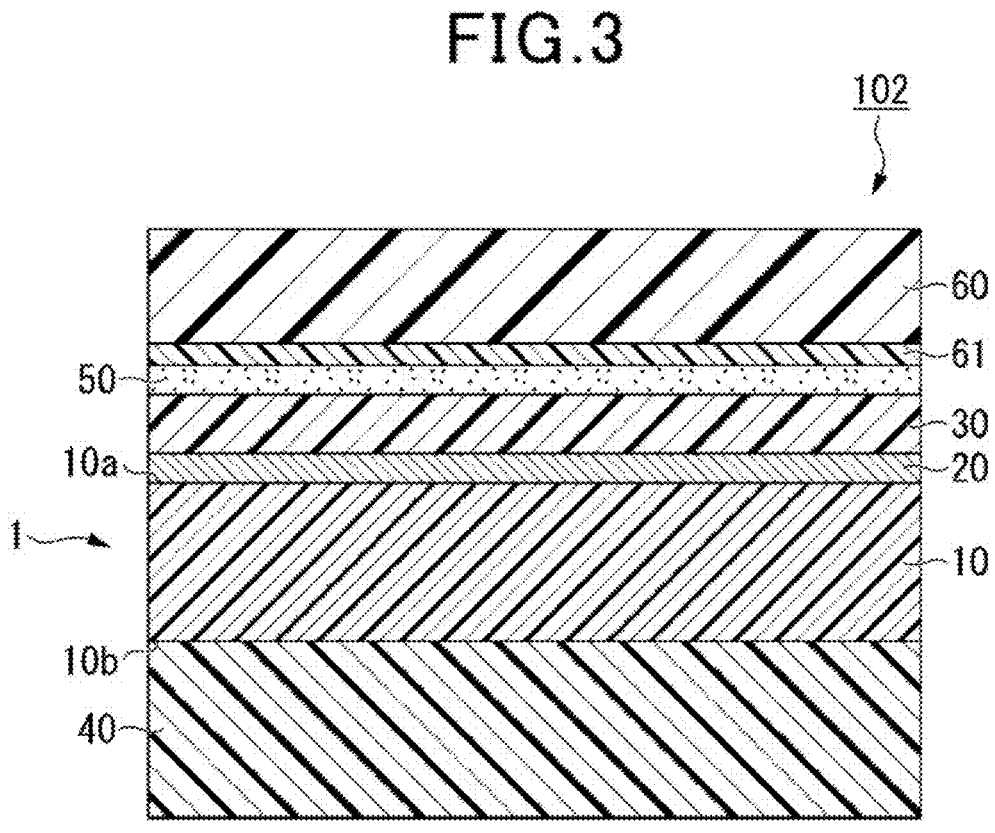
FIG. 3 is a schematic cross-sectional view showing another example of a barrier laminate using the gas barrier film.
FIG. 4 is a graph showing the peel test results of a comparative example.

A barrier laminate 102 shown in FIG. 3 has a configuration in which a surface layer 60 is further bonded above the gas barrier layer 20 of the barrier laminate 101 via an adhesive layer 50. The surface layer 60 may have the same main component as the substrate layer 10. The bonding method of the surface layer 60 may be the same as the bonding method of the heat seal layer 40 described above. Note that at least one of the heat seal layer 40 and the surface layer 60 may be bonded to the gas barrier film 1 with an adhesive.

The surface layer 60 has a printed layer 61 on one surface thereof, and is bonded to the gas barrier layer 20 with the printed layer 61 facing the gas barrier layer 20. The printed layer 61 may be provided on the surface of the surface layer 60 opposite to the surface facing the gas barrier layer 20.

In the case where a packaging material is formed using the barrier laminate 101, the gas barrier layer 20 forms the outer surface of the packaging material, whereas the outer surface of a packaging material formed using the barrier laminate 102 is formed by the surface layer 60. Therefore, by appropriately selecting the material of the surface layer 60, various properties of the packaging material including appearance and scratch resistance can be controlled to suit its purpose or the like. The printed layer 61 can also easily provide a desired appearance, indication, or the like. Further, by bonding the surface layer 60 with the printed layer 61 facing the gas barrier layer 20, a user of the packaging material will not touch the printed layer 61, which prevents deterioration of the printed layer over time as the packaging material is used.

The configuration of the barrier laminate using this gas barrier film 1 is not limited to the example described above. For example, the positions of the surface layer 60 and the heat seal layer 40 may be swapped, and in cases where the barrier laminate includes more layers, the heat seal layer 40 may be provided on both sides of the gas barrier film 1. It is also possible to provide the coating layer 30 between the gas barrier layer 20 and the surface layer 60.

In the gas barrier film of this embodiment, an undercoat layer (not shown) may be provided between the first surface 10a and the gas barrier layer 20. The undercoat layer increases the adhesion between the substrate layer 10 and the gas barrier layer 20 to prevent delamination of the gas barrier layer 20, and protects the first surface 10a from mechanical damage such as scratches and abrasions during, for example, the transportation process before the gas barrier layer is formed. The material for the undercoat layer is not particularly limited, but it may be, for example, thermosetting resin, thermoplastic resin, ultraviolet-curable resin, or electron beam-curable resin.

Examples of the thermosetting resin forming the undercoat layer include a thermosetting urethane resin made of acrylic polyol and an isocyanate prepolymer, phenol resin, urea melamine resin, epoxy resin, unsaturated polyester resin, and silicone resin. In particular, an undercoat layer formed of a composite of an acrylic polyol containing an OH group and an isocyanate compound having at least two NCO groups in the molecule can significantly improve the adhesion between the substrate layer 10 and the gas barrier layer 20.

Acrylic polyol is a polymeric compound or the like that is obtained by polymerizing an (meth)acrylic acid derivative monomer, or by copolymerizing an (meth)acrylic acid derivative monomer with another monomer, has an OH group at an end and on a side chain thereof, and reacts with the NCO group of an isocyanate compound. An (meth) acrylic acid derivative monomer has an OH group at an end and on a side chain thereof. Examples of the (meth)acrylic acid derivative monomer include hydroxyethyl (meth)acrylate and hydroxybutyl (meth)acrylate.

The "another monomer" mentioned above can be copolymerized with an (meth)acrylic acid derivative monomer having an OH group at an end and on a side chain. Examples of the "another monomer" include (meth)acrylic acid derivative monomers having an alkyl group on a side chain, such as methyl (meth)acrylate, ethyl (meth)acrylate, n-butyl (meth)acrylate, and t-butyl (meth)acrylate; (meth)acrylic acid derivative monomers having a COOH group on a side chain, such as (meth)acrylic acid; and (meth)acrylic acid derivative monomers having an aromatic ring or cyclic structure on a side chain, such as benzyl (meth)acrylate and cyclohexyl (meth)acrylate. Examples other than (meth) acrylic acid derivative monomers include styrene monomers, cyclohexylmaleimide monomers, and phenylmaleimide monomers. The "another monomer" itself may have an OH group at an end or on a side chain thereof.

The acrylic polyol is preferably a polymeric compound obtained by polymerizing an (meth)acrylic acid derivative monomer having a COOH group on a side chain, such as (meth)acrylic acid. When forming the undercoat layer, by forming a composite of an acrylic polyol obtained by polymerizing a monomer having a COOH group and an isocyanate compound, a gas barrier film with higher water vapor barrier performance can be obtained.

Although the OH group-containing acrylic polyol that can be used for the undercoat layer is not particularly limited, it is desirable for its hydroxyl value to be 50 mg KOH/g or more and 250 mg KOH/g or less. The hydroxyl value (mg KOH/g) refers to an index of the OH group content in acrylic polyol, which indicates the quantity in mg of potassium hydroxide required to acetylate the OH groups in 1 g of acrylic polyol. The weight average molecular weight of the acrylic polyol is not particularly limited, but specifically, it is preferably 3,000 or more and 200,000 or less. In particular, it is preferably 5,000 or more and 100,000 or less. It is more preferably 5,000 or more and 40,000 or less.

An isocyanate compound has two or more NCO groups in its molecule. Examples of monomeric isocyanates include aromatic isocyanates such as tolylene diisocyanate (TDI), diphenylmethane diisocyanate (MDI), xylylene diisocyanate (XDI), and tetramethylxylylene diisocyanate (TMXDI), and aliphatic isocyanates such as hexamethylene diisocyanate (HDI), bisisocyanate methylcyclohexane (H6XDI), isophorone diisocyanate (IPDI), and dicyclohexylmethane diisocyanate (H12MDI). Polymers or derivatives of these monomeric isocyanates can also be used. Examples include a trimer nurate form, an adduct form obtained by reaction with 1,1,1-trimethylolpropane, and a biuret form obtained by reaction with biuret.

The isocyanate compound may be selected as appropriate from the above isocyanate compounds or polymers and derivatives thereof, and they may be used alone or in a combination of two or more.

An example of the undercoat layer is formed by applying a solution containing a composite of the above-mentioned acrylic polyol and isocyanate compound and a solvent to the first surface 10a of the substrate layer 10, and allowing it to react and cure. The equivalent ratio (NCO/OH) of the NCO groups of the isocyanate compound to the OH groups of the acrylic polyol is preferably 0.3 or more and 2.5 or less. The solvent used here may be any solvent capable of dissolving the acrylic polyol and the isocyanate compound. Examples of the solvent include methyl acetate, ethyl acetate, butyl acetate, cyclohexanone, acetone, methyl ethyl ketone, dioxolane, and tetrahydrofuran. In practical use, these can be used singly or in combination of two or more.

For example, the thermoplastic resin that forms the undercoat layer can be appropriately selected from polyols having two or more hydroxyl groups, such as acrylic polyol, polyester polyol, polycarbonate polyol, polyether polyol, polycaprolactone polyol, and epoxy polyol, polyvinyl resins such as polyvinyl acetate and polyvinyl chloride, polyvinylidene chloride resins, polystyrene resins, polyethylene resins, polypropylene resins, polyurethane resins, and the like. Further, these may be mixed in any ratio. The hydroxyl value of the polyol is not particularly limited, but is desirably 10 mg KOH/g or more and 250 mg KOH/g or less.

The ultraviolet-curable resin or electron beam-curable resin forming the undercoat layer is not particularly limited as an organic polymer resin, but it is desirable for it to at least contain a resin having a hydroxyl value in the range of 10 to 100 mg KOH/g. The organic polymer resin is not particularly limited, but it is preferable that at least a resin having an acid value in the range of 10 to 100 mg KOH/g is contained. The acid value (mg KOH/g) refers to the quantity in mg of potassium hydroxide required to neutralize free fatty acids, resin acids, and the like contained in 1 g of a sample. Further, it is preferable that at least a thermoplastic resin is contained as the organic polymer resin. When the hydroxyl value or acid value is less than 10 mg KOH/g, the chemical bond between the functional group and the surface of the barrier layer 20 weakens, and thus the adhesion to barrier layer 20 decreases. When the hydroxyl value or acid value is more than 100 mg KOH/g, the precipitate containing the OH group generated by decomposition of the undercoat layer in a durability test such as a moisture and heat resistance test tends to inhibit adhesion between the undercoat layer and the barrier layer 20.

Examples of ultraviolet-curable resin or electron beam-curable resin that forms the undercoat layer include monofunctional monomers and polyfunctional monomers such as ethyl (meth)acrylate, ethylhexyl (meth)acrylate, styrene, methylstyrene, N-vinylprrolidone and the like, and, for example, trimethylolpropane (meth)acrylate, hexanediol (meth)acrylate, tripropylene glycol di(meth)acrylate, diethylene glycol (meth)acrylate, pentaerythritol tri (meth)acrylate, dipentaerythritol hexa (meth)acrylate, 1,6-hexanediol di (meth)acrylate, neopentylglycol (meth)acrylate, and the like. The oligomers usable for the ultraviolet or electron beam-curable resin include urethane acrylate, epoxy acrylate, polyester acrylate, and the like.

When two or more types selected from thermosetting resin, thermoplastic resin, ultraviolet-curable resin, and electron beam-curable resin are used in combination as the organic polymer resins forming the undercoat layer, the mixture ratio thereof is not particularly limited.

The undercoat layer may further include an additive as necessary in addition to the organic polymer resin. Examples of the additives include antioxidants, weather-resistant agents, thermostabilizers, lubricants, nucleating agents, UV absorbers, plasticizers, antistatic agents, colorants, fillers, surfactants, and silane coupling agents.

The thickness of the undercoat layer is preferably 0.05 μm or more and 7.0 μm or less. In particular, it is preferably 0.05 μm or more and 0.3 μm or less. When the thickness is less than 0.05 μm, the adhesion between the first surface 10a of the substrate layer 10 and the gas barrier layer 20 becomes insufficient. When the thickness is more than 7.0 μm, the influence of internal stress becomes large. As a result, the gas barrier layer 20 is not properly laminated, the barrier performance is not sufficiently exhibited, and also the transparency and coating accuracy become insufficient.

The undercoat layer can be formed by using a common coating method. For example, a well-known method such as dipping, roll coating, gravure coating, reverse coating, air knife coating, comma coating, die coating, screen printing, spray coating, gravure offset printing, organic vapor deposition, or the like can be used. The drying method may be one or a combination of two or more of heat application methods such as hot air drying, hot roll drying, high frequency irradiation, infrared irradiation, UV irradiation, and electron beam irradiation. Alternatively, a film that has been coated in advance on another resin substrate by the above formation method may be transferred onto the first surface 10a using a transfer method such as adhesive transfer, thermal transfer, or UV transfer.

Second Embodiment

Next, a second embodiment according to the present invention will be described that share a similar basic configuration with the first embodiment. Therefore, similar components will be given the same reference numerals and will not be explained, and only the differences will be explained.

To accurately evaluate the adhesion of the produced barrier laminate, it is important that no zipping occurs in a peel test conforming to JIS K 6854-2 or JIS K 6854-3.

The inventors further investigated a configuration capable of reducing the occurrence of zipping between the substrate layer 10 and the bonded layer in a barrier laminate produced using the gas barrier film 1. As a result, it was found that the occurrence of zipping can be suitably reduced by forming the second surface 10b of the substrate layer 10 with a copolymer. Although the mechanism behind this is not completely clear, it is considered that the improved flexibility of the layer achieved by forming it with a copolymer contributes to this by reducing the occurrence of fine cracks that cause zipping during peeling.

Examples of the copolymer forming the second surface 10b of the substrate layer 10 include the copolymers described as example materials for the substrate layer 10 of the first embodiment. When the substrate layer 10 has a multilayer structure, the substrate layer 10 may have a layer containing polypropylene or polyethylene as a main component and a layer made of a copolymer forming the second surface 10b.

Note that the types and number of monomers forming the copolymer is not particularly limited. Thus, the copolymer may be constituted by three or more types of monomers and may not contain a monomer such as ethylene or propylene contained in the layer to be bonded.

Based on the above findings obtained through investigations, the inventors successfully achieved both high adhesion during the production of the barrier laminate and reducing the occurrence of zipping in a peel test by forming the second surface 10b of the substrate layer 10 with a copolymer, and controlling the polar component value of the surface free energy of the second surface to be 0.1 mJ/m$^2$ or more in the gas barrier film according to this embodiment.

The inventors also found that in a gas barrier film 1 having the heat seal layer 40 according to this embodiment, when the peel strength between the substrate layer 10 and the heat seal layer 40 is 1.0 N/15 mm or more and 7.0 N/15 mm or less in a 180° peel test in accordance with JIS K 6854-2, and 1.0 N/15 mm or more and 4.0 N/15 mm or less in a T-peel test in accordance with JIS K 6854-3, it is possible to achieve good adhesion to the second surface 10b of the substrate layer 10 and reduce the occurrence of zipping in a peel test. When at least one of the peel strengths under the two measurement conditions is below the corresponding range, the adhesion of the second surface 10b of the substrate layer 10 may not be as strong as desired. When at least one of the peel strengths under the two measurement conditions falls outside the corresponding range, there will be parts where the adhesion between the two layers is too weak or strong. It is considered that this variation in adhesion over the bonding area between the two layers increases the likeliness of zipping.

The gas barrier film according to the present embodiment will be further described using Examples and Comparative Examples. The technical scope of the present invention should not be limited in any way solely based on the specific contents of these Examples and Comparative Examples.

Example 1

A three-layer polypropylene film (total thickness 20 μm) having an EVOH layer (thickness 1 μm) on the first surface side, a polypropylene-polyethylene copolymer layer (thickness 1 μm) on the second surface side, and a polypropylene homopolymer layer (thickness 18 μm) in the middle between the first and second surfaces was used as the substrate layer 10. The main component of this substrate layer is polypropylene.

SiO was sublimated in a vacuum apparatus, and a gas barrier layer 20 (thickness 30 nm) made of silicon oxide (SiOx) was formed on the EVOH layer by electron beam deposition.

While maintaining the vacuum state, a plasma treatment was performed on the second surface of the substrate layer

10 using Ar gas at a plasma treatment intensity of 67 W·sec/m².

The plasma treatment intensity was calculated as follows.

Plasma treatment intensity=power density [W/m²]×
treatment time [sec]

Power density [W/m²]=input power [W]/cathode
area [m²]

Treatment time [sec]=electrode MD width [m]/treat-
ment rate [m/sec]

The polar component value of the surface free energy of the second surface after the gas barrier film was completed was calculated based on the contact angle values of water and diiodomethane measured using a goniometer (DMs-401, manufactured by Kyowa Interface Science Co., Ltd.). The contact angle was measured one second after applying a droplet of 2.5 μl. The surface free energy (=polar component value+dispersion component value) and each of its component values were calculated using the commonly used Owens-Wendt-Rabel-Kaelble (WORK, Kaelble-Uy) method. The polar component value of the surface free energy of the second surface after plasma treatment was 0.1 mJ/m².

Subsequently, a coating agent, which was obtained by mixing the following solutions A and B at a mass ratio of 6:4, was applied to the gas barrier layer 20 by gravure coating, and dried to form a coating layer 30 of 0.4 μm thickness.

Solution A: Hydrolyzed solution of a solid content of 3 wt % (equivalent to $SiO_2$) obtained by adding 89.6 g of hydrochloric acid (0.1 N) to 10.4 g of tetraethoxysilane, and stirring for 30 minutes for hydrolysis Solution B: 3 wt % water/isopropyl alcohol solution of polyvinyl alcohol (water:isopropyl alcohol at weight ratio of 90:10))

The gas barrier film according to Example 1 was thus produced.

Example 2

A gas barrier film according to Example 2 was produced in the same manner as in Example 1, except that the plasma treatment intensity was 100 W·sec/m². The polar component value of the surface free energy of the second surface was 0.2 mJ/m².

Example 3

A gas barrier film according to Example 3 was produced in the same manner as in Example 1, except that the plasma treatment intensity was 300 W·sec/m². The polar component value of the surface free energy of the second surface was 0.4 mJ/m².

Example 4

A gas barrier film according to Example 4 was produced in the same manner as in Example 1, except that the plasma treatment intensity was 500 W·sec/m². The polar component value of the surface free energy of the second surface was 1.0 mJ/m².

Example 5

A gas barrier film according to Example 5 was produced in the same manner as in Example 1, except that the plasma treatment intensity was 100 W·sec/m², and the plasma treatment was performed using $O_2$ gas. The polar component value of the surface free energy of the second surface was 1.3 mJ/m².

Example 6

A gas barrier film according to Example 6 was produced in the same manner as in Example 5, except that the plasma treatment intensity was 300 W·sec/m². The polar component value of the surface free energy of the second surface was 1.6 mJ/m².

Example 7

The gas barrier film of Example 7 was produced in the same manner as in Example 1, except that the substrate layer 10 was a two-layer polypropylene film (total thickness 20 μm) having a terpolymer (copolymer) layer (thickness 1 μm) made of polypropylene, polyethylene, and 1-butene on the first surface side, and a polypropylene homopolymer layer (thickness 19 μm) below the first surface including the second surface. The polar component value of the surface free energy of the second surface was 0.1 mJ/m².

Example 8

A gas barrier film according to Example 8 was produced in the same manner as in Example 7, except that the plasma treatment intensity was 100 W·sec/m². The polar component value of the surface free energy of the second surface was 0.2 mJ/m².

Example 9

A gas barrier film according to Example 9 was produced in the same manner as in Example 7, except that the plasma treatment intensity was 300 W·sec/m². The polar component value of the surface free energy of the second surface was 0.8 mJ/m².

Example 10

A gas barrier film according to Example 10 was produced in the same manner as in Example 7, except that the plasma treatment intensity was 500 W·sec/m². The polar component value of the surface free energy of the second surface was 1.2 mJ/m².

Example 11

A gas barrier film according to Example 11 was produced in the same manner as in Example 7, except that the plasma treatment intensity was 100 W·sec/m², and the plasma treatment was performed using $O_2$ gas. The polar component value of the surface free energy of the second surface was 1.9 mJ/m².

Example 12

A gas barrier film according to Example 12 was produced in the same manner as in Example 11, except that the plasma treatment intensity was 300 W·sec/m². The polar component value of the surface free energy of the second surface was 3.0 mJ/m².

Comparative Example 1

A gas barrier film according to Comparative Example 1 was produced in the same manner as in Example 1, except that the plasma treatment was not performed on the second surface. The polar component value of the surface free energy of the second surface was 0.0 mJ/m$^2$.

Comparative Example 2

A gas barrier film according to Comparative Example 2 was produced in the same manner as in Example 7, except that the plasma treatment was not performed on the second surface. The polar component value of the surface free energy of the second surface was 0.0 mJ/m$^2$.

The gas barrier films according to the Examples and Comparative Examples were evaluated as follows.

After that, the peel strength between the upper and lower samples was measured using an Autograph manufactured by SHIMADZU CORPORATION according to JIS K 6854-2 and JIS K 6854-3. That is, in the blocking evaluation, the peel test is carried out between the second surface of the substrate layer of the upper sample and the coating layer of the lower sample. Two types of measurements, namely, T-peel and 180° peel, were performed. It was determined that blocking occurred if either of the measurements showed a peel strength of 0.1 N/15 mm or more.

The results are shown in Table 1.

TABLE 1

| | | Plasma treatment conditions | | | Surface free energy polar component value [mJ/m$^2$] | Adhesion of second surface | | Blocking | |
|---|---|---|---|---|---|---|---|---|---|
| | | | | | | | | Peel strength [N/15 mm] | |
| | Second surface composition | Presence of treatment | Gas used | Treatment intensity [W · sec/m$^2$] | | JIS K 6854-3 T-peel | JIS K 6854-2 180° peel | JIS K 6854-3 T-peel | JIS K 6854-2 180° peel |
| Ex. 1 | Copolymer | Yes | Ar | 67 | 0.1 | 2.8 | 4.9 | 0.01 | 0.01 |
| Ex. 2 | Copolymer | Yes | Ar | 100 | 0.2 | 2.9 | 4.8 | 0.02 | 0.02 |
| Ex. 3 | Copolymer | Yes | Ar | 300 | 0.4 | 2.9 | 5.0 | 0.01 | 0.02 |
| Ex. 4 | Copolymer | Yes | Ar | 500 | 1.0 | 3.0 | 4.8 | 0.01 | 0.02 |
| Ex. 5 | Copolymer | Yes | O$_2$ | 100 | 1.3 | 2.9 | 4.8 | 0.12 | 0.21 |
| Ex. 6 | Copolymer | Yes | O$_2$ | 300 | 1.6 | 2.9 | 4.6 | 0.11 | 0.20 |
| Ex. 7 | Homopolymer | Yes | Ar | 67 | 0.1 | 2.2 | 1.6 (*) | 0.02 | 0.02 |
| Ex. 8 | Homopolymer | Yes | Ar | 100 | 0.2 | 2.3 | 1.6 (*) | 0.02 | 0.02 |
| Ex. 9 | Homopolymer | Yes | Ar | 300 | 0.8 | 2.3 | 1.6 (*) | 0.01 | 0.02 |
| Ex. 10 | Homopolymer | Yes | Ar | 500 | 1.2 | 2.3 | 1.6 (*) | 0.02 | 0.02 |
| Ex. 11 | Homopolymer | Yes | O$_2$ | 100 | 1.9 | 2.3 | 1.7 (*) | 0.02 | 0.11 |
| Ex. 12 | Homopolymer | Yes | O$_2$ | 300 | 3.0 | 2.4 | 1.7 (*) | 0.02 | 0.20 |
| Comp. Ex. 1 | Copolymer | No | — | — | 0.0 | 0.1 | 0.1 | 0.01 | 0.01 |
| Comp. Ex. 2 | Homopolymer | No | — | — | 0.0 | 0.1 | 0.1 | 0.01 | 0.01 |

(Adhesion Evaluation of Second Surface)

A 70 μm thick unstretched polypropylene film (ZK207, manufactured by Toray Industries, Inc.) was bonded to the second surface of the gas barrier film of each Example by dry lamination using a two-component polyurethane adhesive to provide a heat seal layer, and further, a 20 μm thick stretched polypropylene film (U1, manufactured by Mitsui Chemicals Tohcello Inc.) was bonded to the coating layer 30 by dry lamination using a two-component polyurethane adhesive to provide a surface layer, thereby preparing the barrier laminate of each Example.

For each of the Examples, a test piece was cut out from the barrier laminate according to JIS K 6854-2 for 180° peel and JIS K 6854-3 for T-peel, and the peel strength between the substrate layer and the heat seal layer was measured using a Tensilon universal testing machine RTC-1250 manufactured by Orientec Limited. Two types of measurements, namely, T-peel and 180° peel, were performed. If the peel strength is 1 N/15 mm or more in both T-peel and 180° peel, it can be said that there is sufficient adhesion on the second surface.

(Evaluation of Blocking)

Two square samples, each measuring 70 mm on a side, were cut out from each gas barrier film and stacked. A CO-201 permanent strain tester (blocking tester), manufactured by TESTER SANGYO CO., LTD., was used to apply a pressure of 200 kg to the stacked samples, and the samples were stored at 50° C. for 2 days.

For all of the Examples shown in Table 1, the peel strength in the adhesion evaluation of the second surface was 1 N/15 mm or more in the T-peel test, which indicated that there was enough adhesion between the heat seal layer provided on the second surface side and the substrate layer. Examples 1 to 6, in which the second surface is a copolymer layer, showed a peel strength of 1 N/15 mm or more in the 180° peel test as well.

As for Examples 7 to 12, in which the second surface is a homopolymer layer, the average of the minimum and maximum measured values in the 180° peel test was used as the peel strength, and all showed a peel strength of 1 N/15 mm or more, confirming that the adhesion between the substrate layer and the heat seal layer was sufficient. Note that zipping was observed in the 180° peel test for Examples 7 to 12. Zipping is a phenomenon in which the surfaces being peeled do not separate smoothly, but the peeling progresses and stops alternately, causing the peel strength to change intermittently. In Table 1, the peel strengths of the samples that experienced zipping during the 180° peel test are marked with (*).

The second surface 10b of the substrate layer 10 of Examples 1 to 6, which satisfy 2.0 N/15 mm or more in the 180° peel adhesion evaluation of the second surface, has good adhesion, and these Examples can also suppress the occurrence of zipping during the peel test.

For Examples 1 to 4 and Examples 7 to 10, which had a polar component value of the surface free energy of the second surface of less than 1.3 mJ/m², the peel strength in the blocking evaluation was less than 0.1 N/15 mm in both the T-peel and 180° peel, indicating that blocking was sufficiently suppressed.

On the other hand, although Comparative Examples 1 and 2 did not experience blocking, the peel strength values were low in the adhesion evaluation of the second surface, which indicates that the adhesion between the substrate layer and the heat seal layer was insufficient.

Now, the present invention will be described more closely using other Examples. The technical scope of the present invention should not be limited in any way solely based on the specific contents of these Examples.

Example 2-1

A three-layer polypropylene film (total thickness 20 μm) having an EVOH layer (thickness 1 μm) on the first surface side, a copolymer layer (thickness 1 μm) made of a terpolymer of propylene, ethylene, and 1-butene on the second surface side, and a polypropylene homopolymer layer (thickness 18 μm) in the middle between the first and second surfaces was used as the substrate layer 10. The main component of this substrate layer is polypropylene.

SiO was sublimated in a vacuum apparatus, and a gas barrier layer 20 (thickness 30 nm) made of silicon oxide (SiOx) was formed on the EVOH layer by electron beam deposition.

While maintaining the vacuum state, a reactive ion etching (RIE) treatment device was used to perform a plasma treatment on the second surface of the substrate layer 10 using Ar gas at a plasma treatment intensity of 83 W·sec/m².

The plasma treatment intensity was calculated as follows.

Plasma treatment intensity=power density [W/m²]× treatment time [sec]

Power density [W/m²]=input power [W]/cathode area [m²]

Treatment time [sec]=electrode MD width [m]/treatment rate [m/sec]

Subsequently, a coating agent, which was obtained by mixing the following solutions A and B at a mass ratio of 6:4, was applied to the gas barrier layer 20 by gravure coating, and dried to form a coating layer 30 of 0.4 μm thickness.

Solution A: Hydrolyzed solution of a solid content of 3 wt % (equivalent to $SiO_2$) obtained by adding 89.6 g of hydrochloric acid (0.1 N) to 10.4 g of tetraethoxysilane, and stirring for 30 minutes for hydrolysis Solution B: 3 wt % water/isopropyl alcohol solution of polyvinyl alcohol (water:isopropyl alcohol at weight ratio of 90:10))

The gas barrier film according to Example 2-1 was thus produced.

The polar component value of the surface free energy of the second surface after the gas barrier film was completed was calculated based on the contact angle values of water and diiodomethane measured using a goniometer (DMs-401, manufactured by Kyowa Interface Science Co., Ltd.). The contact angle was measured one second after applying a droplet of 2.5 μl. The surface free energy (=polar component value+dispersion component value) and each of its component values were calculated using the commonly used Owens-Wendt-Rabel-Kaelble (WORK, Kaelble-Uy) method. The polar component value of the surface free energy of the second surface was 0.1 mJ/m².

Example 2-2

A gas barrier film according to Example 2-2 was produced in the same manner as in Example 2-1, except that the copolymer layer on the second surface side was formed of a copolymer of propylene and ethylene, and plasma treatment was performed using $O_2$ gas at a treatment intensity of 331 W·sec/m² using a magnetron sputtering device (MF treatment device) with an MF power supply. The polar component value of the surface free energy of the second surface was 0.2 mJ/m².

Example 2-3

A gas barrier film according to Example 2-3 was produced in the same manner as in Example 2-2, except that the plasma treatment intensity was 993 W·sec/m². The polar component value of the surface free energy of the second surface was 0.3 mJ/m².

Example 2-4

A gas barrier film according to Example 2-4 was produced in the same manner as in Example 2-1, except that the copolymer on the second surface side was formed with a copolymer of propylene and ethylene, and the plasma treatment intensity was 300 W·sec/m². The polar component value of the surface free energy of the second surface was 0.4 mJ/m².

Example 2-5

A gas barrier film according to Example 2-5 was produced in the same manner as in Example 2-4, except that the plasma treatment intensity was 500 W·sec/m². The polar component value of the surface free energy of the second surface was 1.0 mJ/m².

Example 2-6

A gas barrier film according to Example 2-6 was produced in the same manner as in Example 2-1, except that the copolymer on the second surface side was formed with a copolymer of propylene and ethylene, and the plasma treatment was performed using $O_2$ gas and at a treatment intensity of 100 W·sec/m². The polar component value of the surface free energy of the second surface was 1.3 mJ/m².

Example 2-7

A gas barrier film according to Example 2-7 was produced in the same manner as in Example 2-1, except that the plasma treatment intensity was 500 W·sec/m². The polar component value of the surface free energy of the second surface was 1.5 mJ/m².

Comparative Example 2-1

A gas barrier film according to Comparative Example 2-1 was produced in the same manner as in Example 2-1, except that the plasma treatment was not performed on the second surface. The polar component value of the surface free energy of the second surface was 0.0 mJ/m².

Comparative Example 2-2

A gas barrier film according to Comparative Example 2-2 was produced in the same manner as in Example 2-2, except that the plasma treatment was not performed on the second surface. The polar component value of the surface free energy of the second surface was 0.0 mJ/m$^2$.

Comparative Example 2-3

A gas barrier film according to Comparative Example 2-3 was produced in the same manner as in Comparative Example 2-1, except that the thickness of the polypropylene homopolymer layer was 19 μm and no copolymer layer was provided on the second surface. The polar component value of the surface free energy of the second surface was 0.0 mJ/m$^2$.

Comparative Example 2-4

A gas barrier film according to Comparative Example 2-4 was produced in the same manner as in Example 2-3, except that the thickness of the polypropylene homopolymer layer was 19 μm and no copolymer layer was provided on the second surface. The polar component value of the surface free energy of the second surface was 0.3 mJ/m$^2$.

Comparative Example 2-5

A gas barrier film according to Comparative Example 2-5 was produced in the same manner as in Example 2-2, except that the thickness of the polypropylene homopolymer layer was 19 μm, no copolymer layer was provided on the second surface, and the plasma treatment intensity was 1325 W·sec/m$^2$. The polar component value of the surface free energy of the second surface was 0.4 mJ/m$^2$.

Comparative Example 2-6

A gas barrier film according to Comparative Example 2-6 was produced in the same manner as in Example 2-1, except that the thickness of the polypropylene homopolymer layer was 19 μm, no copolymer layer was provided on the second surface, and the plasma treatment was performed using O$_2$ gas at a treatment intensity of 83 W·sec/m$^2$. The polar component value of the surface free energy of the second surface was 1.2 mJ/m$^2$.

Comparative Example 2-7

A gas barrier film according to Comparative Example 2-7 was produced in the same manner as in Comparative Example 2-6, except that the plasma treatment intensity was 300 W·sec/m$^2$. The polar component value of the surface free energy of the second surface was 2.0 mJ/m$^2$.

Comparative Example 2-8

A gas barrier film according to Comparative Example 2-8 was produced in the same manner as in Comparative Example 2-7, except that the plasma treatment intensity was 500 W·sec/m$^2$. The polar component value of the surface free energy of the second surface was 3.8 mJ/m$^2$.

The gas barrier films according to the Examples and Comparative Examples were evaluated as follows.

(Adhesion Evaluation of Second Surface)

A 70 μm thick unstretched polypropylene film (ZK207, manufactured by Toray Industries, Inc.) was bonded to the second surface of the gas barrier film of each Example by dry lamination using a two-component polyurethane adhesive to provide a heat seal layer, and further, a 20 μm thick stretched polypropylene film (U1, manufactured by Mitsui Chemicals Tohcello Inc.) was bonded to the coating layer 30 by dry lamination using a two-component polyurethane adhesive to provide a surface layer, thereby preparing the barrier laminate of each Example.

For each of the Examples, a test piece was cut out from the barrier laminate according to JIS K 6854-2 for 180° peel and JIS K 6854-3 for T-peel, and the peel strength between the substrate layer and the heat seal layer was measured using a Tensilon universal testing machine RTC-1250 manufactured by Orientec Limited. Two types of measurements, namely, T-peel and 180° peel, were performed. If the peel strength is 1 N/15 mm or more in both T-peel and 180° peel, it can be said that there is sufficient adhesion on the second surface.

(Evaluation of Blocking)

Two square samples, each measuring 70 mm on a side, were cut out from each gas barrier film and stacked. A CO-201 permanent strain tester blocking tester, manufactured by TESTER SANGYO CO., LTD., was used to apply a pressure of 200 kg to the stacked samples, and the samples were stored at 50° C. for 2 days.

After that, the peel strength between the upper and lower samples was measured using an Autograph manufactured by SHIMADZU CORPORATION according to JIS K 6854-2 and JIS K 6854-3. That is, in the blocking evaluation, the peel test is carried out between the second surface of the substrate of the upper sample and the coating layer of the lower sample. Two types of measurements, namely, T-peel and 180° peel, were performed. It was determined that blocking occurred if either of the measurements showed a peel strength of 0.1 N/15 mm or more.

The results are shown in Table 2.

TABLE 2

| | Second surface composition | Plasma treatment | Gas | Treatment intensity [W · sec/m$^2$] | Surface free energy polar component value [mJ/m$^2$] | Adhesion of second surface JIS K 6854-3 T-peel | Adhesion of second surface JIS K 6854-2 180° peel | Blocking JIS K 6854-3 T-peel | Blocking JIS K 6854-2 180° peel |
|---|---|---|---|---|---|---|---|---|---|
| Ex. 2-1 | Copolymer (terpolymer) | RIE | Ar | 83 | 0.1 | 2.0 | 5.7 | 0.03 | 0.04 |
| Ex. 2-2 | Copolymer | MF | O$_2$ | 331 | 0.2 | 2.4 | 5.7 | 0.02 | 0.03 |
| Ex. 2-3 | Copolymer | MF | O$_2$ | 993 | 0.3 | 2.8 | 5.9 | 0.02 | 0.03 |
| Ex. 2-4 | Copolymer | RIE | Ar | 300 | 0.4 | 2.8 | 5.9 | 0.01 | 0.02 |
| Ex. 2-5 | Copolymer | RIE | Ar | 500 | 1.0 | 2.6 | 6.0 | 0.01 | 0.02 |

TABLE 2-continued

| | | | | | Surface free energy | Peel strength [N/15 mm] | | | |
| | | | | | | Adhesion of second surface | | Blocking | |
| | Second surface composition | Plasma treatment | Gas | Treatment intensity [W · sec/m$^2$] | polar component value [mJ/m$^2$] | JIS K 6854-3 T-peel | JIS K 6854-2 180° peel | JIS K 6854-3 T-peel | JIS K 6854-2 180° peel |
|---|---|---|---|---|---|---|---|---|---|
| Ex. 2-6 | Copolymer | RIE | O$_2$ | 100 | 1.3 | 2.9 | 5.7 | 0.12 | 0.21 |
| Ex. 2-7 | Copolymer (terpolymer) | RIE | Ar | 500 | 1.5 | 2.6 | 5.7 | 0.30 | 0.35 |
| Comp. Ex. 2-1 | Copolymer (terpolymer) | No | — | — | 0.0 | 0.1 | 0.1 | 0.02 | 0.02 |
| Comp. Ex. 2-2 | Copolymer | No | — | — | 0.0 | 0.1 | 0.1 | 0.01 | 0.01 |
| Comp. Ex. 2-3 | Homopolymer | No | — | — | 0.0 | 0.1 | 0.1 | 0.01 | 0.01 |
| Comp. Ex. 2-4 | Homopolymer | MF | O$_2$ | 993 | 0.3 | 2.9 | 0.1-4.3 | 0.02 | 0.02 |
| Comp. Ex. 2-5 | Homopolymer | MF | O$_2$ | 1325 | 0.4 | 3.1 | 0.1-5.5 | 0.02 | 0.03 |
| Comp. Ex. 2-6 | Homopolymer | RIE | O$_2$ | 83 | 1.2 | 3.3 | 0.0-2.4 | 0.04 | 0.05 |
| Comp. Ex. 2-7 | Homopolymer | RIE | O$_2$ | 300 | 2.0 | 1.5 | 0.0-0.3 | 0.02 | 0.03 |
| Comp. Ex. 2-8 | Homopolymer | RIE | O$_2$ | 500 | 3.8 | 2.2 | 0.5-2.6 | 0.06 | 0.10 |

For all of the Examples shown in Table 2, the peel strength in the adhesion evaluation of the second surface was 1 N/15 mm or more in both the T-peel test and 180° peel test, which indicates that there is enough adhesion between the heat seal layer provided on the second surface side and the substrate layer. For Examples 2-1 to 2-5, which had a polar component value of the surface free energy of the second surface of less than 1.3 mJ/m$^2$, the peel strength in the blocking evaluation was less than 0.1 N/15 mm in both the T-peel and 180° peel, indicating that blocking was sufficiently suppressed.

On the other hand, Comparative Examples 2-1 to 2-3 had low peel strength values in the adhesion evaluation of the second surface, which indicates that the adhesion between the substrate layer and the heat seal layer was insufficient.

For Comparative Examples 2-4 to 2-8, in which the second surface is a homopolymer layer, the zipping phenomenon, in which the peel strength alternates between low and high values, was observed in the 180° peel adhesion evaluation of the second surface. As an example, FIG. 4 shows a graph of a 180° peel measurement chart for Comparative Example 2-5 which experienced the zipping phenomenon.

Here, the zipping phenomenon is a phenomenon in which the surfaces to be peeled do not separate smoothly, but the peeling progresses and stops alternately, causing the peel strength to change intermittently. It is believed that the zipping phenomenon is likely to occur when, in the bonding area between the two layers, the adhesive strength in the direction in which the peeling progresses is not constant and the adhesive strength varies from place to place. A barrier laminate with a variation in adhesive strength between the substrate layer and the heat seal layer, it may break at a location where the adhesive strength is weak. Therefore, by checking whether or not the zipping phenomenon occurs, it is possible to check the uniformity of the adhesion of the second surface of the barrier laminate and the uniformity of the breaking strength.

Since zipping was observed with Comparative Examples 2-4 to 2-8 in Table 2, the minimum and maximum peel strength values are shown in the column for the 180° peel measurement results of the adhesion evaluation of the second surface. Based on the results of Comparative Examples 2-4 to 2-8, it can be determined that the zipping phenomenon occurs when the difference between the maximum and minimum peel strength values is 0.3 N/15 mm or more. As for Examples 2-1 to 2-7 and Comparative Examples 2-1 to 2-3, since the difference between the maximum and minimum peel strength values was small, and no zipping phenomenon was observed during the test, the average value of the measured values is shown in Table 2 as their peel strength. Considering the evaluation results shown in Table 2, it is considered that the zipping phenomenon is unlikely to occur when the difference between the maximum and minimum peel strength values in the 180° peel test is smaller than 0.3 N/15 mm.

Comparative Example 2-8 had a polar component value of the surface free energy of the second surface of 1.3 mJ/m$^2$ or more, and also experienced blocking.

While an embodiment and examples of the present invention have been described, the specific configurations are not limited to the above embodiment, and various modifications and combinations of the configurations can be made without departing from the principle of the present invention.

REFERENCE SIGNS LIST

1 . . . Gas barrier film; 10 . . . Substrate layer; 10a . . . First surface; 10b . . . Second surface; 20 . . . Gas barrier layer; 30 . . . Coating layer; 40 . . . Heat seal layer; 60 . . . Surface layer; 61 . . . Printed layer; 101, 102 . . . Gas barrier laminate.

What is claimed is:

1. A gas barrier laminate, comprising:
a substrate containing polypropylene or polyethylene as a main component;
a gas barrier layer formed on a side of a first surface of the substrate; and a heat seal layer that is formed on a second surface of the substrate, the second surface being opposite to the first surface of the substrate, and the heat seal layer contains polypropylene or polyethylene as a main component, wherein a peel strength between the substrate and the heat seal layer is 1.0 N/15 mm or more and 7.0 N/15 mm or less in a 180° peel test in accordance with JIS K 6854-2, 1.0 N/15 mm or more and 4.0 N/15 mm or less in a T-peel test in accordance with JIS K 6854-3, and a polar component value of a surface free energy of the second surface of the substrate is in a range from 0.1 $mJ/m^2$ to 1.0 $mJ/m^2$.

2. The gas barrier laminate of claim 1, wherein the second surface of the substrate is made of a copolymer.

3. The gas barrier laminate of claim 1, wherein the gas barrier layer contains at least one of silicon oxide, silicon oxide containing carbon, silicon nitride, metallic aluminum, and aluminum oxide.

4. The gas barrier laminate of claim 1, wherein the substrate is a multilayer film and the first surface is made of any one of polypropylene; polyethylene; a composite of polypropylene and polyethylene; a composite of polypropylene, polyethylene, and an α-olefin; polyvinyl alcohol; and an ethylene-vinyl alcohol copolymer.

5. The gas barrier laminate of claim 1, further comprising a coating layer formed on the gas barrier layer, wherein the coating layer contains any one of a metal alkoxide, a hydrolysate of a metal alkoxide, a water-soluble macromolecule, a polycarboxylic acid polymer, a polyvalent metal compound, and a polyvalent metal salt of a carboxylic acid that is a reaction product of a polycarboxylic acid polymer and a polyvalent metal compound.

6. The gas barrier laminate of claim 1, further comprising an undercoat layer provided between the first surface and the gas barrier layer, wherein the undercoat layer contains at least one of thermosetting resin, thermoplastic resin, ultraviolet-curable resin, or electron beam-curable resin.

7. The gas barrier laminate of claim 1, wherein the peel strength between the substrate and the heat seal layer is 2.0 N/15 mm or more and 7.0 N/15 mm or less in the 180° peel test in accordance with JIS K 6854-2.

8. The gas barrier laminate of claim 2, wherein a difference between maximum and minimum values of the peel strength in the 180° peel test is less than 0.3 N/15 mm.

9. The gas barrier laminate of claim 1, further comprising a surface layer that contains a main component that is the same as that of the substrate and is bonded to the gas barrier film.

10. The gas barrier laminate of claim 9, wherein at least one of the heat seal layer and the surface layer is bonded to the gas barrier film with an adhesive.

11. The gas barrier laminate of claim 9, wherein the surface layer has a printed layer on at least one surface.

12. The gas barrier laminate of claim 2, wherein the copolymer forming the second surface of the substrate is a terpolymer of propylene, ethylene, and 1-butene.

13. The gas barrier laminate of claim 1, wherein the substrate layer consists of a three-layer structure comprising: a first layer forming the first surface and comprising an ethylene-vinyl alcohol copolymer; a second layer forming an intermediate layer and comprising a polypropylene homopolymer; and a third layer forming the second surface and comprising a copolymer of propylene and ethylene, or a terpolymer of propylene, ethylene, and 1-butene.

14. The gas barrier laminate of claim 13, wherein the third layer of the substrate layer is a terpolymer of propylene, ethylene, and 1-butene.

15. The gas barrier laminate of claim 5, wherein the coating layer has a thickness in a range from 0.1 μm to 1.0 μm.

16. The gas barrier laminate of claim 3, wherein the gas barrier layer has a thickness in a range from 6 nm to 150 nm.

17. The gas barrier laminate of claim 6, wherein the undercoat layer has a thickness in a range from 0.05 μm to 0.3 μm.

18. The gas barrier laminate of claim 1, wherein the substrate layer further comprises at least one additive selected from the group consisting of an antiblocking agent, a lubricant, and a slip agent.

19. A gas barrier laminate, comprising: a substrate layer having a three-layer structure consisting of (i) a first layer of 0.5 μm to 2 μm thickness comprising an ethylene-vinyl alcohol copolymer, (ii) a second layer of 10 μm to 30 μm thickness comprising a polypropylene homopolymer, and (iii) a third layer of 0.5 μm to 2 μm thickness comprising a terpolymer of propylene, ethylene, and 1-butene; a gas barrier layer formed on the first layer of the substrate layer, the gas barrier layer comprising silicon oxide and having a thickness of 10 nm to 100 nm; a coating layer formed on the gas barrier layer, the coating layer comprising a mixture of polyvinyl alcohol and a hydrolysate of tetraethoxysilane and having a thickness of 0.1 μm to 1.0 μm; and a heat seal layer comprising polypropylene bonded to the third layer of the substrate layer; wherein a polar component value of a surface free energy of a surface of the third layer is in a range from 0.1 $mJ/m^2$ to 0.4 $mJ/m^2$, a peel strength between the substrate layer and the heat seal layer is 2.0 N/15 mm or more and 7.0 N/15 mm or less in a 180° peel test, and a difference between maximum and minimum values of the peel strength in the 180° peel test is less than 0.3 N/15 mm.

20. The gas barrier laminate of claim 19, further comprising a printed layer provided on at least one surface of a surface layer bonded to the coating layer via an adhesive layer.

* * * * *